US005402471A

United States Patent [19]
Van Nielen

[11] Patent Number: 5,402,471
[45] Date of Patent: Mar. 28, 1995

[54] METHOD OF TRANSFERRING BETWEEN EXCHANGE CENTERS THE HANDLING OF AN ACTIVE CONNECTION BETWEEN A USER AND A MOBILE TERMINAL

[75] Inventor: Marcus J. J. Van Nielen, Leidschendam, Netherlands

[73] Assignee: Koninklijke PTT Nederland N.V., Groningen, Netherlands

[21] Appl. No.: 984,978

[22] Filed: Dec. 3, 1992

[30] Foreign Application Priority Data

Dec. 9, 1991 [NL] Netherlands .................. 9102047

[51] Int. Cl.6 .................................... H04M 11/00
[52] U.S. Cl. ........................... 379/60; 379/58; 379/59
[58] Field of Search ............... 379/58, 59, 60, 63; 455/33.1, 33.2

[56] References Cited

U.S. PATENT DOCUMENTS

| | | | |
|---|---|---|---|
| 4,398,063 | 8/1983 | Hass et al. | 379/60 |
| 4,881,271 | 11/1989 | Yamauchi et al. | 379/60 X |
| 5,018,187 | 4/1991 | Marinho et al. | 379/60 |

FOREIGN PATENT DOCUMENTS

| | | |
|---|---|---|
| 0421535A1 | 4/1991 | European Pat. Off. |
| 2193861 | 2/1988 | United Kingdom ........ 379/59 |

OTHER PUBLICATIONS

Heidermark et al, "Signalling System No. 7 in Sweden", May 1990, Proceeding pp. 43–48, International Switching Symposium—Session B1, Paper 3.

K. Alsmar, "Network Enhancements to Meet Cellular User Demands", 1985, pp. 415–420, Proceedings of the National Communications Forum.

Nakajima, et al, "Enlarging Technologies based on No. 7 Signalling System for Mobile Communication Network", Nov. 1987, pp. 1583–1588, Globecom—Paper 40.5.

Primary Examiner—Curtis Kuntz
Assistant Examiner—G. J. Dehling
Attorney, Agent, or Firm—Frishauf, Holtz, Goodman & Woodward

[57] ABSTRACT

Known methods of transferring between centers the handling of an active connection between a user and a mobile terminal in a telecommunication system designed for mobile communication generally have the disadvantage that the routing obtained is inefficient. By investigating both a first route between a first switching center and the user and a second route between a second switching center and the user for common centers which are able to handle call control and connection control separately, of which the common center situated nearest the first switching center is designated as a central intelligence point or, if the latter is not found, by designating the center situated nearest the user as a central intelligence point and then setting up a connection between the central intelligence point found in this way and the second switching center, the most efficient routing is obtained.

7 Claims, 3 Drawing Sheets

METHOD OF TRANSFERRING BETWEEN EXCHANGE CENTERS THE HANDLING OF AN ACTIVE CONNECTION BETWEEN A USER AND A MOBILE TERMINAL

BACKGROUND OF THE INVENTION

The invention relates to a method of transferring between switching centers the handling of an active connection between a user, on the one hand, and a mobile terminal, on the other hand, in a telecommunication system designed for mobile communication, comprising at least one mobile terminal, a first and a second switching center designed for mobile services and each having a working region with a limited range, and a communication network designed for nonmobile telecommunication, which network has switching centers, hereinafter referred to as "exchange" centers able to interact with the switching centers designed for mobile services, there being a first route between the first switching center and the user, via which first route the active connection has been set up, and there being a second route between the second switching center designed for mobile service and the user, which routes each have at least one intelligence point where connection control and call control can be handled separately from each other, a capability which is a definition of the term "intelligence point" as used hereinafter.

Such a method is disclosed by EP 0 421 535 A1 and allowed U.S. patent application, Ser. No. 07/900,521. The latter describes how an existing method for transferring between two switching centers designed for mobile services the active connection to a mobile terminal, better known under the designation "handover procedure" and as defined, for example, in GSM recommendations for the future pan-European digital mobile telecommunication system, can be improved. In addition to a number of attractive aspects, this existing method has the great drawback that the switching center via which the active connection is initiated remains incorporated in the communication path to the mobile terminal for the entire duration of the connection, even if said connection moves to the working region of another switching center. Another drawback of this existing method is that the first switching center involved in an active connection provides the billing for the entire time that the connection is active, as a result of which it is not possible to adjust the billing if the mobile station moves to a region having a different charge rate. The method described in EP 0 421 535 A1 does not have the above drawbacks because, in this method, in addition to a connection set up between the exchange center designed for nonmobile telecommunication and the first switching center, a connection is set up between the first and the second switching exchange center and between the center designed for nonmobile telecommunication and the second switching center, and the entire handling of the connection is taken over by the second switching center, after which the connection between the two switching centers and between the exchange center designed for nonmobile telecommunication and the first switching center is disconnected. As a result, the switching center via which the active connection is initiated is not incorporated in the communication path to the mobile terminal for the entire duration of the connection and it is possible to adjust the billing.

This known method described in EP 0 421 535 A1 has the disadvantage that the setting up of the connection between the second switching exchange center and the center designed for nonmobile telecommunication to which the first switching center is already connected may result in inefficient routing depending on the way in which the user may be coupled to one or both switching exchange centers via various centers designed for nonmobile telecommunication or via a third switching center and depending on the facilities of said exchange centers designed for nonmobile telecommunication and on the switching centers. Some switching centers, for example, have the possibility of being able to handle connection control and call control separately, as a result of which it becomes possible to reroute an existing connection without having to interrupt or disconnect it for a long time. As defined, for example, in GSM recommendations, at least one such switching center is always present in every route between the mobile terminal and the user.

SUMMARY OF THE INVENTION

The object of the invention is, inter alia, to provide a method of the type stated in the introduction, in which routing is carried out as efficiently as possible and in which the possibilities of exchange centers designed for nonmobile telecommunication and of the switching centers are optimally utilised. For the sake of completeness, it is pointed out in this connection that the application of the method provided does not have to be limited to GSM but is also possible in other mobile telecommunication systems.

For this purpose, the method according to the invention has the characteristic that, for a predetermined time interval, both routes are investigated for common intelligence points belonging both to the first route and the second route, and to
- if one common intelligence point is found, it is designated as central intelligence point,
- if several common intelligence points are found, an intelligence point situated nearest the first switching center is designated as central intelligence point, and
- if no common intelligence point is found, an intelligence point of the first route, which intelligence point is not common and is situated nearest the user, is designated as central intelligence point, a connection also being set up between the central intelligence point and the second switching center, information needed for the transfer of the handling of the active connection being transferred from at least one center situated on the first route to at least one center situated in the connection set up, and the connection via the first switching center between the central intelligence point and the mobile terminal being disconnected after the active connection to the mobile terminal has been taken over by the second switching center.

The invention is based on the insight that, with future signalling and control signals in telecommunication networks such as the recently developed ISCP (Integrated Services Digital Network Signalling Control Part) which forms a component of the signalling system No. 7 (C7), it becomes possible to arrange for exchange centers designed for nonmobile telecommunication to handle the connection control and the call control separately from each other and that it is, of course, possible to provide different switching centers with this possibility. In this way, the most efficient routing is obtained with the given possibilities of exchange centers designed for nonmobile telecommunication and the switching centers by investigating the first and the second route for common intelligence points belonging to both routes (read: by investigating for the presence of one or more common switching exchange centers and/or centers designed for nonmobile telecommunication having the possibility of separately handling the connection control and the call control), by choosing, if one common intelligence point is found, said intelligence point as central intelligence point, by choosing, if several common intelligence points are found, a common intelligence point situated nearest the first switching center as central intelligence point, and by choosing, if no common intelligence point is found, an intelligence point of the first route, which intelligence point is not common and is situated nearest the user, as central intelligence point, and by then setting up a connection between the central intelligence point and the second switching center, information needed for the transfer of the handling of the active connection being transferred from at least one center situated on the first route to at least one center situated in the connection set up and the connection via the first switching center between the central intelligence point and the mobile terminal being disconnected after the active connection to the mobile terminal has been taken over by the second switching center.

Whereas it was still necessary in the known method as described in EP 0 421 535 A1 to transfer both signalling information and data such as speech from the first switching center to the second switching center for a short time (the so-called GSM step), in the method according to the invention it is only the signalling information which has to be transferred from a center (switching center or exchange center designed for nonmobile telecommunication) situated on the first route between the central intelligence point and the first switching center (both included) to a center (switching center or exchange center designed for nonmobile telecommunication) situated in the connection set up, and this results in a further increase in the efficiency.

A first embodiment of the method according to the invention has the characteristic that, if the predetermined time interval is exceeded, an intelligence point situated nearest the user and belonging both to the first route and to a route situated between the first and second switching center is designated as central intelligence point.

The "handover procedure" is a process which is critical with respect to time, and consequently the chosen predetermined time interval must not be too long. If the predetermined time interval is exceeded, this first embodiment establishes a (temporary) routing via which the handover can take place.

A second embodiment of the method according to the invention has the characteristic that, if no common intelligence point for the first and second routes is found as a consequence of the predetermined time interval being exceeded, a route found between the second switching center and the user via the central intelligence point and also the second route are then investigated for common intelligence points.

If no common intelligence points are found during the predetermined time interval, although they are nevertheless present, the choosing of another intelligence point may result in less efficient routing. As a result of then investigating the route found between the second switching center and the user via the central intelligence point and also investigating the second route for common intelligence points, the most efficient routing is nevertheless ultimately obtained without the connection between the user and the mobile terminal having to be disconnected or interrupted for a long time as a result of the temporarily less efficient routing.

A third embodiment of the method according to the invention has the characteristic that the common intelligence point is either a switching center or an exchange center designed for nonmobile communication having a bridge setting facility.

An exchange center may have switching facilities in which a primary connection is coupled either to a first secondary connection or to a second secondary connection. In this connection, the disadvantage arises that a switching click cannot always be avoided during the switching. If a center has a bridge setting facility, a primary connection is first coupled to the first secondary connection, then both to the first and to the second secondary connection and then to the secondary connection alone, so that the switching click disadvantage does not arise. Such a facility as above defined is necessarily provided in switching centers designed for mobile services because off the nature of the radio "connection". As a result of the abovementioned ISCP techniques, exchange centers designed for nonmobile telecommunication are also easily able to have bridge setting facilities.

REFERENCE

EP 0 421 535 A1

EXEMPLARY EMBODIMENTS

The invention will be explained in greater detail by reference to an exemplary embodiment shown in the figures. In the figures:

FIG. 1 shows a diagrammatic representation of a telecommunication system, designed for mobile communication, in which routing is carried out efficiently by applying the method according to the invention, and FIGS. 2A and 2B together show a flow chart of an embodiment of the method according to the invention.

DETAILED DESCRIPTION

Figure 1:
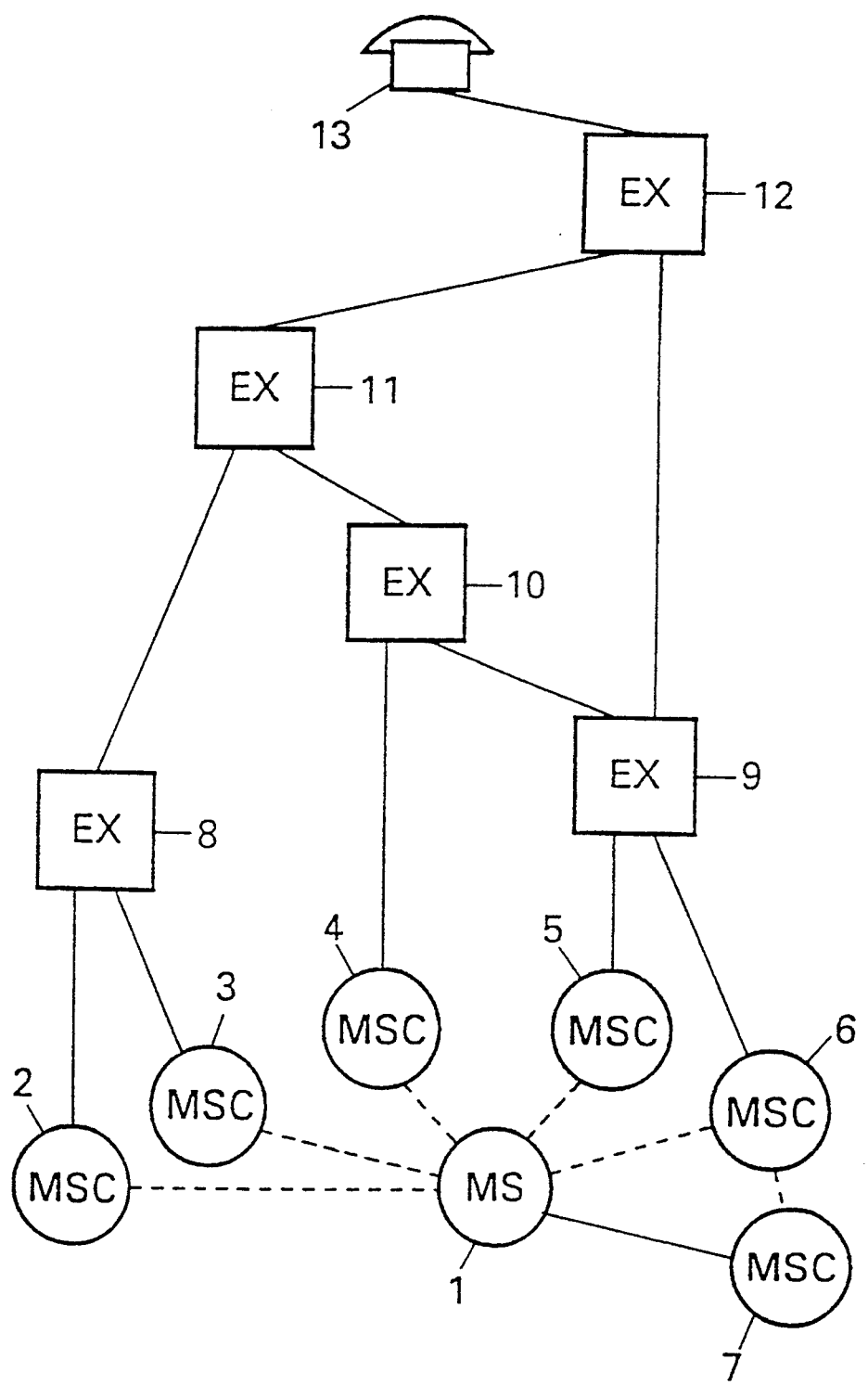

FIG. 1 shows diagrammatically a telecommunication system designed for mobile communication. Said system comprises a mobile terminal 1 (mobile station or MS) which can be coupled via a radio path to switching centers 2, 3, 4, 5, 6 and 7 (mobile switching center or MSC). MSC 2 and 3 can be coupled to an exchange center 8 (EXchange or EX) for nonmobile telecommunication, MSC 4 can be coupled to an EX 10 and MSC 5 and 6 can be coupled to an EX 9. MSC 7 can be coupled to MSC 6. EX 8 can furthermore be coupled to an EX 11, EX 10 can furthermore be coupled to EX 11 and EX 9, and EX 9 and EX 11 can each furthermore be coupled to an EX 12, which is connected to a user 13.

The application of the method in this system proceeds as follows. If MS 1 is situated in the working region of MSC 2, MS 1 is coupled via a radio path to MSC 2 which is connected to the user 13, for example, via EX 8, EX 11 and EX 12, and communication takes place between MS 1 and user 13. If MS 1 moves from the working region of MSC 2 to the working region of MSC 3, the first, or old, route expressed in numbers is in this case 2-8-11-12-13 and the second, or new, route expressed in numbers is, for example 3-8-11-12-13 and both routes are investigated in the course of a predetermined time interval for common intelligence points belonging to both routes, in which process one of the three following cases A, B and C arises:

A) One of the EXs 8, 11 and 12 is found to be the common intelligence point:

A1) If EX 8 is found to be the common intelligence point (that is to say EX 8 has the possibility of handling the connection control and the call control separately from each other), EX 8 is designated as central intelligence point, in which case a connection is set up between EX 8 and MSC 3, the information needed for the transfer of the handling of the active connection is transferred from MSC 2 to MSC 3 via EX 8 and the connection via MSC 2 between EX 8 and MS 1 is disconnected after the active connection to MS 1 has been taken over by MSC 3.

A2) If EX 11 is found to be the common intelligence point (that is to say EX 11 has the possibility of handling the connection control and the call control separately from each other) EX 11 is designated as central intelligence point, in which case a connection is set up between EX 11 and MSC 3 via EX 8, information needed for the transfer of the handling of the active connection is transferred from MSC 2 to MSC 3 via EX 8 and the connection between EX 11 and MS 1 via MSC 2 is disconnected after the active connection to MS 1 has been taken over by MSC 3.

A3) If EX 12 is found to be the common intelligence point (that is to say EX 12 has the possibility of handling the connection control and the call control separately from each other), EX 12 is designated as central intelligence point, in which case a connection is set up between EX 12 and MSC 3 via EX 11 and EX 8, information needed for the transfer of the handling of the active connection is transferred from MSC 2 to MSC 3 via EX 8 and the connection via MSC 2 between EX 12 and MS 1 is disconnected after the active connection to MS 1 has been taken over by MSC 3.

B) Two or three of the EXs 8, 11 and 12 are found to be the common intelligence points:

B1) If both EX 8 and EX 11 and/or EX 12 are found to be common intelligence points, EX 8 is designated as central intelligence point because, of all the common intelligence points found, EX 8 is situated nearest MSC 2, and the further procedure is as in A1).

B2) If both EX 11 and EX 12 are found to be common intelligence points and EX 8 is not so found, EX 11 is designated as central intelligence point because, of all the common intelligence points found, EX 11 is situated nearest MSC 2, and the further procedure is as in A2).

C) None of the EXs 8, 11 and 12 is found to be a common intelligence point:

MSC 2 is designated as central intelligence point because MSC 2 is in this case the intelligence point located on the first route and situated nearest the user 13, in which case a connection is set up between MSC 2 and MSC 3 via EX 8 and the information needed for the transfer of the handling of the active connection is transferred from MSC 2 to MSC 3 via EX 8 and the connection between MSC 2 and MS 1 is disconnected after the active connection to MS 1 has been taken over by MSC 3. If the predetermined time interval is exceeded before a definitive failure to find a common intelligence point, EX 8 is designated as central intelligence point if EX 8 is then found to be an intelligence point because EX 8 is situated nearest the user 13 and belongs both to the first route and to the route between MSC 2 and MSC 3, and the further procedure is as in A1). If EX 8 is not an intelligence point, MSC 2 is designated as central intelligence point in this case of transgression, and the further procedure is as in C).

Then, if no common intelligence points are found as a consequence of the predetermined time interval being exceeded both the second route and, a (suboptimal) route found between the second switching center (MSC 3) and the user 13 via the central intelligence point can then [sic] be investigated for common intelligence points, in which case, the cases A), B) or C) may again arise, etc. In this connection it should be pointed out that both the second route and the suboptimal route each proceed from MSC 3 and that, in this case, the first and the second switching centers therefore coincide.

Of course it is also possible to make do immediately with the connection found in the case C) without investigating the routes yet again.

If MS 1 is located in the working region of MSC 3, MS 1 is coupled via a radio path to MSC 3, which is connected, for example, via EX 8, EX 11 and EX 12 to the user 13 and communication takes place between MS 1 and user 13. If MS 1 moves from the working region of MSC 3 to the working region of MSC 4 during said communication, the first, or old, route expressed in numbers is in this case 3-8-11-12-13 and the second, or new, route expressed in numbers is, for example, 4-10-11-12-13, and both routes are investigated during the predetermined time interval for common intelligence points belonging to both routes, in which case one of the three following cases D, E and F arises:

D) One of the EXs 11 and 12 is found to be the common intelligence point:

D1) If EX 11 is found to be the common intelligence point (that is to say EX 11 has the possibility of handling the connection control and the call control separately from each other), EX 11 is designated as central intelligence point, in which case a connection is set up between EX 11 and MSC 4 via EX 10, information needed for the transfer of the handling of the active connection is transferred from MSC 3 to MSC 4 via EX 8, EX 11 and EX 10 and/or information is transferred from EX 8 to EX 10 via EX 11, and the connection via MSC 3 between EX 11 and MS 1 is disconnected after the active connection to MS. 1 has been taken over by MSC 4.

D2) If EX 12 is found to be the common intelligence point (that is to say EX 12 has the possibility of handling the connection control and the call control separately from each other), EX 12 is designated as central intelligence point, in which case a connection is set up between EX 12 and MSC 4 via EX 11 and EX 10, information needed for the transfer of the handling of the active connection is transferred from MSC 3 to MSC 4 via EX 8, EX 11 and EX 10 and/or information is transferred from EX 8 to EX 10 via EX 11, and the connection via MSC 3 between EX 12 and MS 1 is disconnected after the active connection to MS 1 has been taken over by MSC 4.

E) Both EXs 11 and 12 are found to be common intelligence points: EX 11 is designated as central intelligence point because, of the two common intelligence points, EX 11 is located nearest MSC 3, and the further procedure is as in D1).

F) Neither of the EXs 11 and 12 is found to be a common intelligence point:

F1) If EX 8 is an intelligence point, EX 8 is designated as central intelligence point because EX 8 is in this case the intelligence point located on the first route and is the intelligence point which is not common and which is located nearest the user 13 (with respect to MSC 3), in which case a connection is set up between EX 8 and MSC 4 via EX 11 and EX 10, information needed for the transfer of the handling of the active connection is transferred from MSC 3 to MSC 4 via EX 8, EX 11 and EX 10 and the connection via MSC 3 between EX 8 and MS 1 is disconnected after the active connection to MS 1 has been taken over by MSC 4.

F2) If EX 8 is not an intelligence point, MSC 3 is designated as central intelligence point because MSC 3 is in this case the intelligence point located on the first route and is the intelligence point which is not common and is situated nearest the user 13, in which case a connection is set up between MSC 3 and MSC 4 via EX 8, EX 11 and EX 10, information needed for the transfer of the handling of the active connection is transferred from MSC 3 to MSC 4 via EX 8, EX 11 and EX 10, and the connection between MSC 3 and MS 1 is disconnected after the active connection to MS 1 has been taken over by MSC 4.

If the predetermined time interval is exceeded, EX 11 is designated as central intelligence point if EX 11 is an intelligence point, since it is situated nearest user 13 and belongs both to the first route and to the route situated between MSC 3 and MSC 4, and the further procedure is as in D1). If EX 11 is not an intelligence point, EX 8 is, in this case of transgression, designated as central intelligence point if it is an intelligence point, and the further procedure is as in F1), and if EX 8 is not an intelligence point, MSC 3 is designated as central intelligence point, and the further procedure is as in F2). Then, if no common intelligence point is found as a consequence of the predetermined time interval being exceeded, both the second route and a (suboptimal) route found between the second switching center (MSC 4) and the user 13 via the central intelligence point can then [sic] be investigated for common intelligence points, in which case the cases D), E) or F) may again arise, etc. In this connection, it should be pointed out that both the second route and the suboptimal route each originate from MSC 4 and that, in this case, the first and second switching centers therefore coincide. Of course, it is also possible to make do with the connection found in the case F) without investigating both routes yet again.

If MS 1 is located in the working region of MSC 4, MS 1 is coupled via a radio path MSC 4 which is connected to the user 13, for example via EX 10, EX 11 and EX 12, and communication takes place between MS 1 and user 13. If MS 1 moves from the working region of MSC 4 to the working region of MSC 5 during this communication, the first, or old, route expressed in numbers is in this case 4-10-11-12-13 and the second, or new, route expressed in numbers is, for example, 5-9-12-13, and both routes are investigated during the predetermined time interval for common intelligence points belonging to both routes, in which case one of the two following cases G and H arises:

G) EX 12 is found to be the common intelligence point (that is to say EX 12 has the possibility of handling the connection control and the call control separately from each other): EX 12 is designated as central intelligence point, in which case a connection is set up between EX 12 and MSC 5 via EX 9, information needed for the transfer of the handling of the active connection is transferred from MSC 4 to MSC 5 via EX 10 and EX 9 and/or information is transferred from EX 10 and/or EX 11 to EX 9, and the connection via MSC 4 between EX 12 and MS 1 is disconnected after the active connection to MS 1 has been taken over by MSC 5.

H) EX 12 is not found to be a common intelligence point:

H1) If EX 11 is an intelligence point, EX 11 is designated as central intelligence point because EX 11 is, in this case, the intelligence point which is located on the first route and the intelligence point which is not common and which is situated nearest the user 13 (with respect to EX 10 and/MSC 4), in which case a connection is set up between EX 11 and MSC 5 via, for example, EX 12 and EX 9, information needed for the transfer of the handling of the active connection is transferred from MSC 4 to MSC 5 via EX 10 and fix 9, and the connection via MSC 4 between EX 11 and MS 1 is disconnected after the active connection to MS 1 has been taken over by MSC 5.

H2) If EX 11 is not an intelligence point and EX 10 is in fact adequate as an intelligence point, EX 10 is designated as central intelligence point because EX 10 is, in this case, the intelligence point located on the first route and the intelligence point which is not common and which is nearest the user 13 (with respect to MSC 4) in which case a connection is set up between EX 10 and MSC 5 via EX 9, information needed for the transfer of the handling of the active connection is transferred from MSC 4 to MSC 5 via EX 10 and EX 9, and the connection via MSC 4 between EX 10 and MS 1 is disconnected after the active connection to MS 1 has been taken over by MSC 5.

H3) If neither EX 11 nor EX 10 is an intelligence point, MSC 4 is designated as central intelligence point because MSC 4 is, in this case, the intelligence point located on the first route and the intelligence point which is not common and is situated nearest the user 13, in which case a connection is set up between MSC 4 and MSC 5 via EX 10 and EX 9, information needed for the transfer of the handling of the active connection is transferred from MSC 4 to MSC 5 via EX 10 and EX 9, and the connection between MSC 4 and MS 1 is disconnected after the active connection to MS 1 has been taken over by MSC 5.

If the predetermined time interval is exceeded, EX 10 is designated as central intelligence point if EX 10 is an intelligence point since it is situated nearest user 13 and belongs both to the first route and to the route situated between MSC 4 and MSC 5, and the further procedure is as in H2). If EX 10 is not an intelligence point, MSC 4 is designated as central intelligence point, and the further procedure is as in H3). Then, if no common intelligence point is found as a consequence of the predetermined time interval being exceeded, both the second route and a (suboptimal) route found between the second switching center (MSC 5) and the user 13 via the central intelligence point can then [sic] be investigated for common,intelligence points, in which case the cases G) or H) may again arise, etc. In this connection, it should be pointed out that both the second route and the suboptimal route each originate from MSC 5 and that, in this case, the first and second switching centers therefore coincide. Of course, it is also possible to make do with the connection found in the case H) without investigating both routes yet again.

If MS 1 is located in the working region of MSC 5, MS 1 is coupled via a radio path to MSC 5 which is connected, for example, via EX 9 and EX 12 to the user 13, and communication takes place between MS 1 and user 13. If MS 1 moves from the working region of MSC 5 to the working region of MS 6 during said communication, the first, or old, route expressed in numbers is in this case 5-9-12-13 and the second, or new, route expressed in numbers is, for example, 6-9-12-13, and both routes are investigated during the predetermined time interval for common intelligence points belonging to both routes, in which case one of the three following cases I, J and K arises:

I) One of the EXs 9 and 12 is found to be the common intelligence point:
  I1) If EX 9 is found to be the common intelligence point (that is to say EX 9 has the possibility of handling the connection control and the call control separately from other), EX 9 is designated as central intelligence point, in which case a connection is set up between EX 9 and MSC 6, information needed for the transfer of the handling of the active connection is transferred from MSC 5 to MSC 6 via EX 9, and the connection via MSC 5 between EX 9 and MS 1 is disconnected after the active connection to MS 1 has been taken over by MS 6.
  I2) If EX 12 is found to be the common intelligence point (that is to say EX 12 has the possibility of handling the connection control and the call control separately from other), EX 12 is designated as central intelligence point, in which case a connection is set up between EX 12 and MSC 6 via EX 9, information needed for the transfer of the handling of the active connection is transferred from MSC 5 to MSC 6 via EX 9, and the connection via MSC 5 between EX 12 and MS 1 is interrupted after the active connection to MS 1 is taken over by MSC 6.
J) Both EXs 9 and 12 are found to be common intelligence points: EX 9 is designated as central intelligence point because, of the two common intelligence points, EX 9 is located nearest MSC 5, and the further procedure is as in I1).
K) Neither of the EXs 9 and 12 is found to be a common intelligence point: MSC 5 is designated as central intelligence point because MSC 5 is in this case the intelligence point located on the first route and the intelligence point which is not common and is situated nearest the user 13, in which case a connection is set up between MSC 5 and MSC 6 via EX 9, information needed for the transfer of the handling of the active connection is transferred from MSC 5 to MSC 6 via EX 9, and the connection between MSC 5 and MS 1 is disconnected after the active connection to MS 1 has been taken over by MSC 6. If the predetermined time interval is exceeded, EX 9 is designated as central intelligence point if EX 9 is an intelligence point, because it is situated nearest the user 13 and belongs both to the first route and to the route situated between MSC 5 and MSC 6, and the further procedure is as in I1). If EX 9 is not an intelligence point, MSC 5 is designated as central intelligence point, and the further procedure is as in K). Then, if no common intelligence points are found as a consequence of the predetermined time interval being exceeded, both the second route and a (suboptimal) route found between the second switching center (MSC 6) and the user 13 via the central intelligence point, can then be investigated for common intelligence points, in which case the cases I), J) or K) may again arise, etc. In this connection it should be pointed out that both the second route and the suboptimal route each originate from MSC 6 and that, in this case, the first and second switching centers therefore coincide. Of course, it is also possible to make do directly with the connection found in the case K without investigating both routes yet again.

If MS 1 is located in the working region of MSC 6, MS 1 is coupled via a radio path to MSC 6 which is connected, for example, via EX 9 and EX 12 to the user 13, and communication takes place between MS 1 and user 13. If MS 1 moves from the working region of MSC 6 to the working region of MSC 7 during said communication, which MSC 7 forms part, for example, of a private or individual network, the first, or old, route expressed in numbers is in this case 6-9-12-13 and the second, or new route expressed in numbers is, for example, 7-6-9-12-13, and both routes are investigated during the predetermined time interval for common intelligence points belonging to both routes, in which case MSC 6 is normally found to be the common intelligence point and is consequently designated as central intelligence point because, regardless of whether EX 9 and EX 12 are or are not found to be common intelligence points, MSC 6 is, of all the possible common intelligence points found, the nearest to the first switching center (=MSC6). A connection is then set up between MSC 6 and MSC 7, information needed for the transfer of the handling of the active connection is transferred from MSC 6 to MSC 7 and the connection between MSC 6 and MS 1 is interrupted after the active connection to MS 1 has been taken over by MSC 7.

The above description of FIG. 1 must under no circumstances be regarded as limiting since many other situations are also conceivable, both as regards the configuration of the telecommunication system and as regards the chosen routings. Thus, it is possible, for example, that the MS 1 located in the working region of MS 5 communicates with user 13 via MSC 5, EX 9, EX 10, EX 11 and EX 12 because the link between EX 9 and EX 12 is temporarily overloaded. In this case, the first, or old, route expressed in numbers is 5-9-10-11-12-13 (and therefore not 5-9-12-13). If, during said communication, MS 1 moves from the working region of MSC 5 to the working region of MSC 6 at an instant when said link is again free of overloading, the second, or new, route expressed in numbers is, for example, 6-9-12-13, and both routes are investigated during the predetermined time interval for common intelligence points belonging to both routes, in which case one of the three following cases L, M and N arises:

L) One of the EXs 9 and 12 is found to be the common intelligence point:

L1) If EX 9 is found to be the common intelligence point (that is to say EX 9 has the possibility of handling the connection control and the call control separately from each other), EX 9 is designated as central intelligence point, in which case a connection is set up between EX 9 and MSC 6, information needed for the transfer of the handling of the active connection is transferred from MSC 5 to MSC 6 via EX 9, and the connection via MSC 5 between EX 9 and MS 1 is disconnected after the active connection to MS 1 has been taken over by MS 6.

L2) If EX 12 is found to be the common intelligence point (that is to say EX 12 has the possibility of handling the connection control and the call control separately from each other), EX 12 is designated as central intelligence point, in which case a connection is set up between EX 12 and MSC 6 via EX 9, information needed for the transfer of the handling of the active connection is transferred from MSC 5 to MSC 6 via EX 9, and the connection via MSC 5 between EX 12 and MS 1 is disconnected after the active connection to MS 1 has been taken over by MSC 6.

M) Both EXs 9 and 12 are found to be a common intelligence point: EX 9 is designated as central intelligence point because, of the two common intelligence points, EX 9 is located nearest MSC 5, and the further procedure is as in L1).

N) Neither EXs 9 and 12 is found to be a common intelligence point:

N1) If EX 11 is an intelligence point, EX 11 is designated as central intelligence point because EX 11 is in this case the intelligence point located on the first route and the intelligence point which is not common and which is situated nearest the user 13 (with respect to EX 10 and MSC 5), in which case a connection is set up between EX 11 and MSC 6 via, for example, EX 12 and EX 9, information needed for the transfer of the handling of the active connection is transferred from MSC 5 to MSC 6 via EX 9, and the connection via MSC 5 between EX 11 and MS 1 is disconnected after the active connection to MS 1 has been taken over by MSC 6.

N2) If EX 11 is not an intelligence point and EX 10 is in fact an intelligence point, EX 10 is designated as central intelligence point because EX 10 is in this case the intelligence point located on the first route and the intelligence point which is not common and is nearest the user 13 (with respect to MSC 5), in which case a connection is set up between EX 10 and MSC 6 via EX 9, information needed for the transfer of the handling of the active connection is transferred from MSC 5 to MSC 6 via EX 9, and the connection via MSC 5 between EX 10 and MS 1 is disconnected after the active connection to MS 1 has been taken over by MSC 6.

N3) Neither EX 11 nor EX 10 is an intelligence point, MSC 5 is designated as central intelligence point because MSC 5 is in this case the intelligence point located on the first route and the intelligence point which is not common and is situated nearest the user 13, in which case a connection is set up between MSC 5 and MSC 6 via EX 9, information needed for the transfer of the handling of the active connection is transferred from MSC 5 to MSC 6 via EX 9, and the connection between MSC 5 and MS 1 is disconnected after the active connection to MS 1 has been taken over by MSC 6.

If the predetermined time interval is exceeded, EX 9 is designated as central intelligence point if EX 9 is an intelligence point, because it is situated nearest the user 13 and belongs both to the first route and to the route situated between MSC 5 and MSC 6, and the further procedure is as in L1).

If EX 9 is not an intelligence point, MSC 5 is designated as central intelligence point, and the further procedure is as in N3). Then, if no common intelligence points are found as a consequence of the predetermined time interval being exceeded, both the second route and a (suboptimal) route found between the second switching center (MSC 6) and the user 13 via the central intelligence point can then be investigated for common intelligence points, in which case the cases L), M) or N) can again arise, etc.

In this connection it should be pointed out that both the second route and the suboptimal route each originate from MSC 6 and that, in this case, the first and second switching center thus coincide. Of course, it is also possible to make do with the connection found in case K) without investigating both routes yet again.

It is pointed out that the cases L) and M) completely correspond to the cases I) and J) respectively, whereas the case N) clearly differs from the case K) because of the temporary overloading of the link between EX 9 and EX 12.

The position of user 13 in FIG. 1 must also not be regarded as limiting. Thus, it is possible, for example, that the user is a mobile terminal, hereinafter referred to as MS 14, who is not shown in FIG. 1 and who is located, for example, in the working region of MSC 6. If, while MS 1 is located in the working region of MSC 5 and is coupled via a radio path to MSC 5 which is coupled, for example, via EX 9 to MSC 6 which is coupled via a radio path to MS 14, and communication takes place between MS 1 and MS 14, MS 1 moves during said communication from the working region of MSC 5 to the working region of MSC 6, the first, or old, route expressed in numbers is in this case 5-9-6-14 and the second, or new, route expressed in numbers is, for example, 6-14, and both routes are investigated during the predetermined time interval for common intelligence points belonging to both routes. In this situation MS 14 acts as the user, MSC 5 forms the first switching center and MSC 6 the second switching center, and one of the two following cases P and Q arises:

P) MSC 6 is found to be a common intelligence point: MSC 6 is designated as central intelligence point, in which case information needed for the transfer of the handling of the active connection is transferred from MSC 5 to MSC 6, and the connection via MSC 5 between MSC 6 and MS 1 is disconnected after the active connection to MS 1 has been taken over by MSC 6.

Q) MSC 6 is not found to be a common intelligence point:

Q1) If EX 9 is an intelligence point, EX 9 is designated as central intelligence point because EX 9 is in this case the intelligence point located on the first route and the intelligence point which is not common and which is nearest the user MS 14 (with respect to MSC 5), in which case a connection is set up between EX 9 and MSC 6, information needed for the transfer of the handling of the active connection is transferred from MSC 5 to MSC 6 via EX 9, and the connection via MSC 5 between EX 9 and MS 1 is disconnected after the active connection to MS 1 has been taken over by MSC 6.

Q2) If EX 9 is not an intelligence point, MSC 5 is designated as central intelligence point because in this case MSC 5 is the intelligence point located on the first route and the intelligence point which is not common and nearest the user MS 14, in which case a connection is set up between MSC 5 and MSC 6 via EX 9, information needed for the transfer of the handling of the active connection is transferred from MSC 5 to MSC 6 via EX 9, and the connection between MSC 5 and MS 1 is disconnected after the active connection to MS 1 has been taken over by MSC 6.

If, while MS 1 is located in the working region of MSC 5 and is coupled via a radio path to MSC 5, which is coupled, for example, via EX 9 and MSC 6 to MSC 7, which is coupled via a radio path to MS 14, and communication takes place between MS 1 and MS 14, MS 1 moves during said communication from the working region of MSC 5 to the working region of MSC 6, the first, or old, route expressed in numbers is in this case 5-9-6-7-14 and the second, or new, route expressed in numbers is, for example, 6-7-14, and both routes are investigated during the predetermined time interval for common intelligence points belonging to both routes. In this situation MS 14 acts as the user, MSC 5 forms the first switching center and MSC 6 forms the second switching center, and one of the three following cases R, S and T arises:

R) One of the MSCs 6 and 7 is found to be the common intelligence point:

R1) If MSC 6 is found to be the common intelligence point (that is to say MSC 6 has the possibility of handling the connection control and the call control separately from each other), MSC 6 is designated as central intelligence point, in which case information needed for the transfer of the handling of the active connection is transferred from MSC 5 to MSC 6 via EX 9 and the connection via MSC 5 between MSC 6 and MS 1 is disconnected after the active connection to MS 1 has been taken over by MSC 6.

R2) If MSC 7 is found to be the common intelligence point (that is to say MSC 7 has the possibility of handling the connection control and the call control separately from each other), MSC 7 is designated as central intelligence point, in which case a connection is set up between MSC 7 and MSC 6, information needed for the transfer of the handling of the active connection is transferred from MSC 5 to MSC 6 via EX 9, and the connection via MSC 5 between MSC 7 and MS 1 is disconnected after the active connection to MS 1 has been taken over by MSC 6.

S) Both MSCs 6 and 7 are found to be a common intelligence point: MSC 6 is designated as central intelligence point because, of the two common intelligence points, MSC 6 is located nearest the first switching center (=MSC 5), and the further procedure is as in R1).

T) Neither of the MSCs 6 and 7 is found to be a common intelligence point:

T1) If EX 9 is an intelligence point, EX 9 is designated as central intelligence point because EX 9 is in this case the intelligence point located on the first route and the intelligence point which is not common and is situated nearest the user MS 14 (with respect to MSC 5), in which case a connection is set up between EX 9 and MSC 6, information needed for the transfer of the handling of the active connection is transferred from MSC 5 to MSC 6 via EX 9, and the connection via MSC 5 between EX 9 and MS 1 is disconnected after the active connection to MS 1 has been taken over by MSC 6.

T2) If EX 9 is not an intelligence point, MSC 5 is designated as central intelligence point because MSC 5 is in this case the intelligence point located on the first route and the intelligence point which is not common and is situated nearest the user MS 14, in which case a connection is set up between MSC 5 and MSC 6 via EX 9, information needed for the transfer of the handling of the active connection is transferred from MSC 5 to MSC 6 via EX 9, and the connection between MSC 5 and MS 1 is interrupted after the active connection to MS 1 has been taken over by MSC 6.

If, while MS 1 is located in the working region of MSC 6 and is coupled via a radio path to MSC 6 which is coupled to MSC 7 which is coupled via a radio path to MS 14, and communication takes place between MS 1 and MS 14, MS 1 moves during said communication from the working region of MSC 6 to the working region of MSC 7, the first, or old, route expressed in numbers is in this case 6-7-14 and the second, or new, route expressed in numbers is, for example, 7-14, and both routes are investigated during the predetermined time interval for common intelligence points belonging to both routes. In this situation MS 14 acts as the user, MSC 6 forms the first switching center and MSC 7 forms the second switching center and one of the two following cases U and V arises:

U) MSC 7 is found to be the common intelligence point: MSC 7 is designated as central intelligence point, in which case information needed for the transfer of the handling of the active connection is transferred from MSC 6 to MSC 7, and the connection via MSC 6 between MSC 7 and MS 1 is interrupted after the active connection to MS 1 has been taken over by MSC 7.

V) MSC 7 is not found to be a common intelligence point: MSC 6 is designated as central intelligence point, in which case information needed for the transfer of the handling of the active connection is transferred from MSC 6 to MSC 7, and the connection between MSC 6 and MS 1 is disconnected after the active connection to MS 1 has been taken over by MSC 7.

Figure 2A:
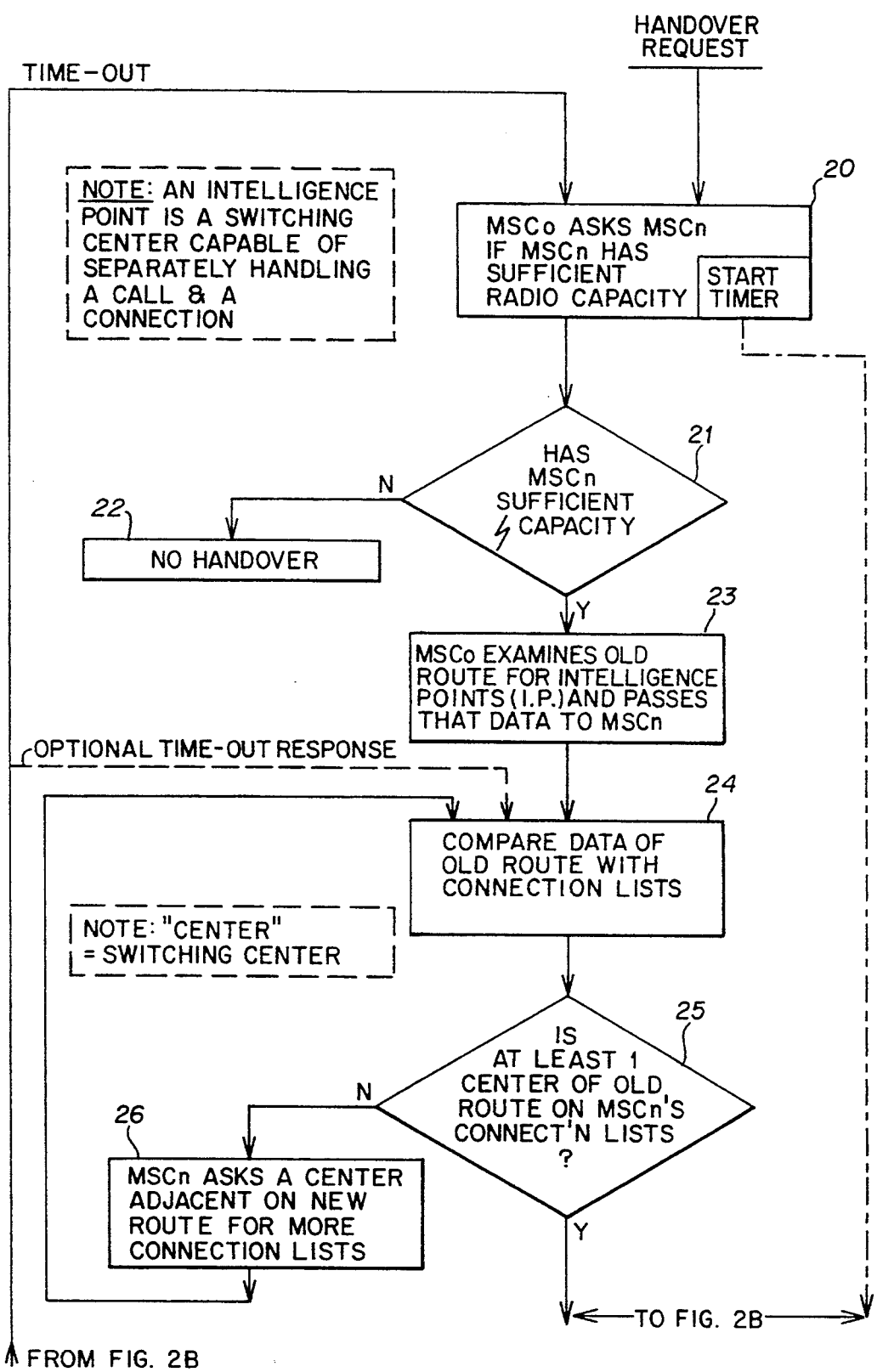
Figure 2B:
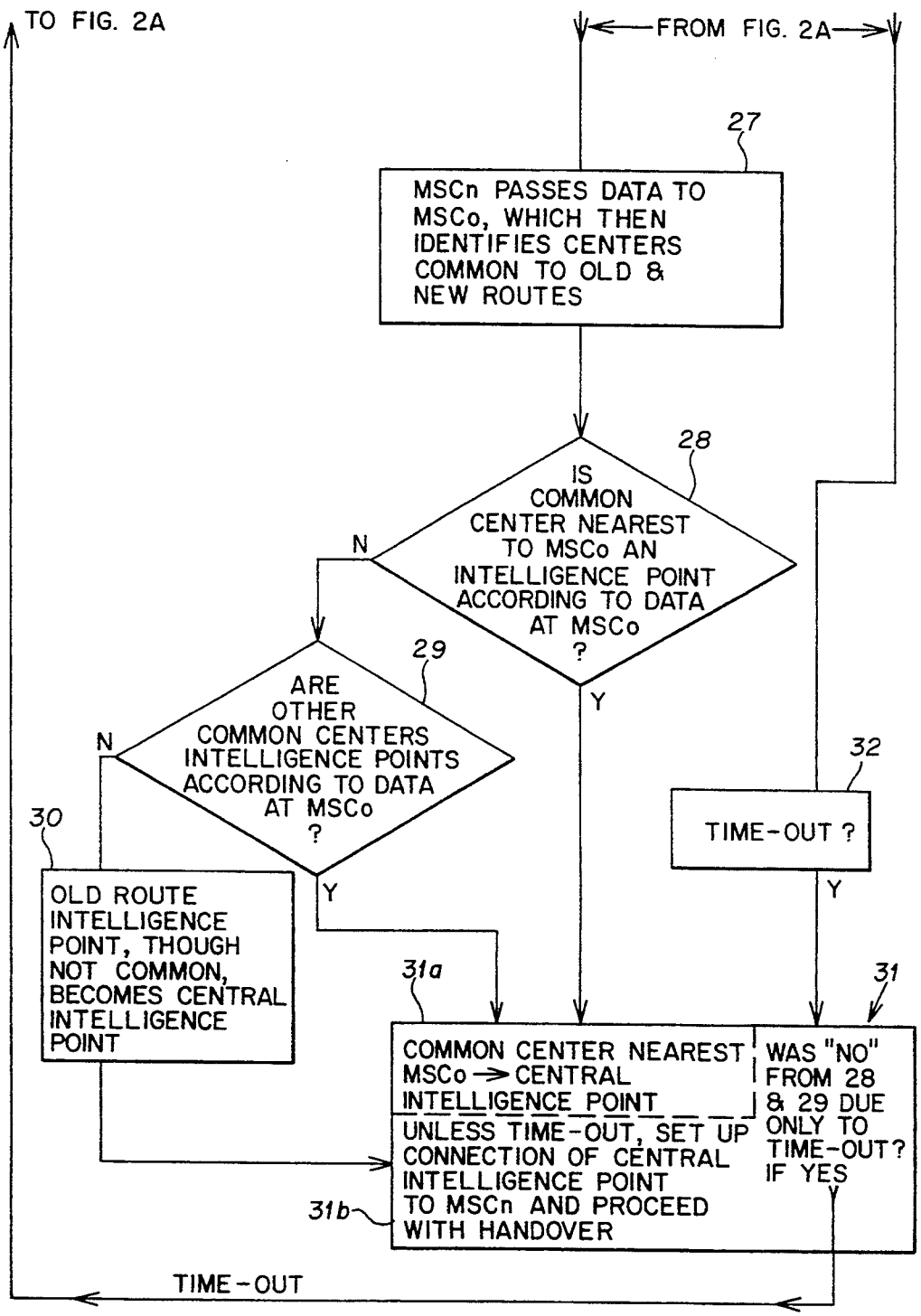

In the flow chart, shown in FIGS. 2A and 2B of an embodiment of the method according to the invention the blocks have the following meaning: block: meaning:

20 during an active call, a first, or old, MSCo via which a mobile terminal is communicating with a user receives an inter-MSC handover request, and MSCo asks a second, or new, MSCn whether it has sufficient radio capacity; simultaneously a timer is started to detect the elapse of a predetermined time interval.

21 has MSCn sufficient radio capacity?
no: to block 22.
yes: to block 23.

22 an inter-MSC handover does not take place as a result of insufficient radio capacity.

23 MSCo passes data relating to a first, or old, route between MSCo and the user to MSCn and inquires whether centers situated on the old route are intelligence points (that is to say whether the latter have the possibility of handling the connection control and the call control separately).

24 MSCn compares the data relating to the old route with connection lists for the purpose of establishing a second or new route between itself and the user.

25 is at least one center in the data relating to the old route known from the connection list of MSCn?
no: to block 26.
yes: to block 27.

26 MSCn requests a connection list from a center situated adjacently on the new route; block 24 then follows.

27 MSCn passes data relating to the known centers to MSCo; these known centers are designated as common centers.

28 is the common center located nearest MSCo an intelligence point according to the data of MSCo?
no: to block 29.
yes: to block 31, the common center is designated as central intelligence point. (see 31a in block 31 in FIG. 2B)

29 are other common centers intelligence points according to the data of MSCo?
no: to block 30.
yes: to block 31, the common center which is situated nearest MSCo and is adequate as an intelligent point is designated as central intelligence point.

30 the old route intelligence point which is not common and which is situated nearest the user is designated as central intelligence point.

31 a connection is set up between the central intelligence point and MSCn, information needed for the transfer of the handling of the active connection is transferred from at least one center situated on the old route to at least one center situated in the connection set up and the connection via MSCo between the central intelligence point and the mobile terminal is disconnected after the active connection to the mobile terminal has been taken over by MSCn.

32 as a consequence of the elapse of the predetermined time interval detected by the timer, the intelligence point situated nearest the user which is located both on the old route and on the route between MSCo and MSCn is designated as central intelligence point, then block 31 follows.

The embodiment of the method as specified in the flow chart in FIGS. 2A and 2B proceeds as follows. As soon as a mobile terminal located in the working region of an MSCo and communicating with a user, via a radio path and MSCo, moves to the working region of an MSCn, MSCo files an inter-MSC handover request (possibly on the initiative of the mobile terminal) and it asks MSCn whether the latter has sufficient radio capacity. Because the handover procedure is a process which is critical with respect to time, a timer is immediately started in order to detect the elapse of a predetermined time interval (block 20). If MSCn has insufficient radio capacity, no inter-MSC handover takes place (block 21, 22). If MSCn has sufficient radio capacity, MSCo passes data relating to a first, or old, route between MSCo and the user to MSCn, and it inquires whether centers situated on the old route are intelligence points (that is to say whether they have the possibility of handling the connection control and the call control separately from each other (block 21, 23)). MSCn has connection lists which make it possible to establish a second or new route between MSCn and the user, and it compares the data obtained from MSCo relating to the old route with said connection lists (block 24). If at least one center situated on the old route is known from the connection lists, at least one common center is consequently found by MSCn, which is then transmitted to MSCo (block 25, 27). If no centers situated on the old route are known from the connection lists of MSCn, the latter are supplemented with connection lists of an adjacent center (block 25, 26) situated on the new route. This takes place as long as no common center has been found and as long as there are still centers remaining on the new route (block 26, 24, 25). MSCo has data relating to whether centers situated on the old route are intelligence points or not and investigates whether the common centers are intelligence points, the common center which is situated nearest MSCo and which is also an intelligence point being designated as central intelligence point (block 28, 29). If no common center which is also an intelligence point is found, an intelligence point of the old route, which intelligence point is not common and is situated nearest the user, is designated as central intelligence point (block 30). If the elapse of the predetermined time interval is detected by the timer, the intelligence point which is situated nearest the user and which is located both on the old route and on the route between MSCo and MSCn is designated as central intelligence point (block 32). A connection is then set up between the central intelligence point and MSCn, information needed for the transfer of the handling of the active connection is transferred from at least one center situated on the old route to at least one center situated in the connection set up, and the connection via MSCo between the central intelligence point and the mobile terminal is disconnected after the active connection to the mobile terminal has been taken over by MSCn (see 31b of block 31). If no common intelligence point is found as a consequence of the predetermined time interval being exceeded or if the most optimally situated intelligence points have not been found as a consequence of, for example, a malfunction or an overload, the suboptimal route found and the second route can then be investigated for common points (block 24 et seq.). In this connection it is pointed out that the old and the new switching center then coincide because the suboptimal route and the second route both run via said switching center.

A number of variations are possible on the embodiment of the method according to the invention shown in FIGS. 2A and 2B. Thus, for example, tasks of MSCo (the transmission of data relating to the old route between MSCo and the user to MSCn, inquiring whether centers situated on the old route are intelligence points, and investigating whether common centers are intelligence points) and tasks of MSCn (having connection lists, comparing the data obtained from MSCo with said connection lists, and possibly supplementing the connection lists) can be distributed in another way between the two switching centers or they may be allotted to a greater or lesser degree to one particular center to be chosen arbitrarily.

The term "centers" has been used in the description of the method as set forth in the flow chart of FIG. 2 as generic to the switching centers designed for mobile services and exchange centers designed for non-mobile communication and the term "intelligence point" has been used throughout this specification as designating a center in which, at least if necessary, the handling of the connection control and the handling of the call control are performed separately from each other.

I claim:

1. Method of transferring between centers the handling of an active connection between a user and a mobile terminal in a telecommunication system designed for mobile communication, the telecommunication system comprising at least one mobile terminal, at least a first and a second switching center designed for mobile services and each having a service region with a limited range, and a network designed for nonmobile telecommunication having a multiplicity of exchange centers, which network is able to interact at least at some of its exchange centers with said switching centers, there being a first route between the first switching center and the user, via which first route the active connection has been set up, and there being a second route between the second switching center and the user, each of said first and second routes having at least one intelligence point which is defined as a center which enables handling connection control and call control separately from each other, wherein the method includes the steps of:

designating a central intelligence point by investigating whether one or more or no intelligence points belonging to both of said routes exists, said one or more intelligence points belonging to both of said routes hereinafter referred to as common intelligence points, and wherein by said designating step said designation is made as follows:

if one common intelligence point is found, it is designated as a central intelligence point, if several common intelligence points are found, a common intelligence point situated nearest the first switching center is designated as the central intelligence point, and if no common intelligence point is found, an intelligence point of the first route, which intelligence point is not common to the first and second routes and which is situated nearest the user, is designated as a central intelligence point, setting up, after the step of designating a central intelligence point, a connection between the central intelligence point and the second switching center, transferring information needed for the transfer of the handling of the active connection from at least one switching center situated on the first route to at least one switching center situated in the connection set up, and disconnecting the connection via the first switching center between the central intelligence point and the mobile terminal after the active connection to the mobile terminal has been taken over by the second switching center.

2. Method according to claim 1, wherein, if a predetermined time interval is exceeded without having found any intelligence points, an intelligence point situated nearest the user and belonging both to the first route and to a route situated between the first and second switching centers is designated as a central intelligence point by said designating step.

3. Method according to claim 1, wherein, if no common intelligence point is found as a consequence of a predetermined time interval being exceeded, the step of designating a central intelligence point is repeated by investigating the second route and a route found between the second switching center and the user via the central intelligence point for identification of common intelligence points.

4. Method according to claim 1, wherein the common intelligence point comprises an exchange center designed for nonmobile communication having a bridge setting facility.

5. Method according to claim 2, wherein, if no common intelligence point is found as a consequence of a predetermined time interval being exceeded, the step of designating a central intelligence point is repeated by investigating the second route and, a route found between the second switching center and the user via the central intelligence point for identification of common intelligence points.

6. Method according to claim 2, wherein the common intelligence point comprises an exchange center designed for nonmobile communications having a bridge setting facility.

7. Method according to claim 3, wherein the common intelligence point comprises an exchange center designed for nonmobile communications having a bridge setting facility.

* * * * *

UNITED STATES PATENT AND TRADEMARK OFFICE
CERTIFICATE OF CORRECTION

PATENT NO. : 5,402,471
DATED : March 28, 1995
INVENTOR(S) : Van Nielen

It is certified that error appears in the above-indentified patent and that said Letters Patent is hereby corrected as shown below:

Column 1,   line 55, delete "exchange";

line 56, before "center", insert --exchange--.

Column 2,   line 1, delete "exchange";

line 2, before "center", insert --exchange--.

line 6, delete "exchange"; and before "centers" (second occurrence), insert --exchange--.

line 35 (line which begins with "ligence"), after "and" insert --to--.;

line 36, delete "to".

Column 3,   line 5, delete "exchange";

line 6, after "/or", insert --exchange--.

UNITED STATES PATENT AND TRADEMARK OFFICE
CERTIFICATE OF CORRECTION

PATENT NO. : 5,402,471

DATED : March 28, 1995

INVENTOR(S) : Van Nielen

It is certified that error appears in the above-indentified patent and that said Letters Patent is hereby corrected as shown below:

Column 4, line 24, "off" should be --of--.

Column 17, line 11, "of FIG. 2" should be --of Figs. 2A and 2B--.

Signed and Sealed this

Seventeenth Day of September, 1996

Attest:

BRUCE LEHMAN

Attesting Officer        Commissioner of Patents and Trademarks